United States Patent [19]

Zegers

[11] Patent Number: 5,470,194
[45] Date of Patent: Nov. 28, 1995

[54] METHOD AND APPARATUS FOR UNLOADING A POULTRY TRANSPORT CONTAINER

[75] Inventor: Cornelis J. M. Zegers, Oostzaan, Netherlands

[73] Assignee: Machinefabriek Meyn B.V., Oostzaan, Netherlands

[21] Appl. No.: 359,437

[22] Filed: Dec. 20, 1994

Related U.S. Application Data

[63] Continuation of Ser. No. 79,246, Jun. 17, 1993, abandoned.

[30] Foreign Application Priority Data

Jun. 23, 1992 [NL] Netherlands ............................ 9201104

[51] Int. Cl.⁶ .................................................. B65G 65/00
[52] U.S. Cl. .......................... 414/786; 119/845; 414/331; 414/416
[58] Field of Search ...................... 414/416, 331, 414/786; 119/843, 845, 846

[56] References Cited

U.S. PATENT DOCUMENTS

| | | | |
|---|---|---|---|
| 223,743 | 1/1880 | Macy, Jr. ............................ | 414/416 X |
| 3,672,335 | 6/1972 | Sanders ................................... | 119/846 |
| 3,718,118 | 2/1973 | Bibler ...................................... | 119/16 |
| 3,722,477 | 3/1973 | Weldy et al. ........................... | 119/846 |
| 3,916,835 | 11/1975 | Reynolds ................................. | 118/12 |
| 4,147,265 | 4/1979 | McGill et al. .......................... | 414/416 |
| 4,365,591 | 12/1982 | Wills et al. ........................ | 119/843 X |
| 4,380,969 | 4/1983 | Thomas ............................... | 119/843 X |
| 4,600,351 | 7/1986 | Nelson ..................................... | 119/846 |
| 4,878,799 | 11/1989 | Seto et al. ............................... | 414/331 |
| 5,060,596 | 10/1991 | Esbroeck ................................. | 119/17 |
| 5,195,687 | 3/1993 | Derichs et al. ..................... | 414/331 X |
| 5,288,201 | 2/1994 | Pippin .................................. | 414/416 X |

FOREIGN PATENT DOCUMENTS

| | | | |
|---|---|---|---|
| 2309137 | 11/1976 | France . | |
| 2508010 | 12/1982 | France . | |
| 3218251 | 12/1982 | Germany .............................. | 414/331 |
| 3447757 | 5/1986 | Germany .............................. | 414/416 |

*Primary Examiner*—David A. Bucci
*Attorney, Agent, or Firm*—Dority & Manning

[57] ABSTRACT

In a method for unloading a poultry transport container, which comprises at least one loading tray with a side unloading flap, the end of a discharge conveyor is applied from the side of the unloading flap closely above the loading tray. This end is gradually moved towards the side of the loading tray opposite the unloading flap, thus forcing the poultry to take place onto the discharge conveyor. The loading tray, the discharge conveyor or both may be displaceable for obtaining their relative movement.

8 Claims, 5 Drawing Sheets

METHOD AND APPARATUS FOR UNLOADING A POULTRY TRANSPORT CONTAINER

This application is a continuation of application Ser. No. 08/079,246 filed Jun. 17, 1993, now abandoned.

BACKGROUND OF THE INVENTION

The present invention relates to a method for unloading a poultry transport container which comprises at least one loading tray with a side unloading flap. Further the invention relates to an apparatus for carrying out this method.

In a known method, a poultry transport container, which is formed by a number of loosely stacked crates, is unstacked at an appropriate location, whereafter the crates are unloaded through their unloading flaps. The poultry unloaded in this manner is then conveyed to a first processing station.

It is a disadvantage of this known unloading method that the poultry is rather disturbed by handling of the crates during unstacking and unloading, especially when the poultry transport container comprises a large number of crates stacked one on top of the other. This makes further processing of the poultry rather difficult. Further, it appears in practice that slaughtering disturbed poultry leads to an inferior quality of the flesh compared to slaughtering calm poultry. Thus it is common practice nowadays that trucks supplying poultry transport containers comprising poultry to a slaughter house stand still for a while near to the slaughter house before starting unloading, such that the poultry will be unloaded at ease. However, the known unloading method completely subverts this effect.

OBJECTS AND SUMMARY OF THE INVENTION

It is an object of the invention to provide a method and apparatus for unloading a poultry transport container in an effective way which eliminates the mentioned disadvantages.

Thus, the method according to the invention is characterized by applying the end of a discharge conveyor from the side of the unloading flap closely above the loading tray and gradually moving the end of the discharge conveyor towards the side of the loading tray opposite the unloading flap.

Because the end of the discharge conveyor is applied closely above the loading tray, the poultry only needs to overcome a small difference in level for being unloaded from the poultry transport container. While the respective end of the discharge conveyor is gradually moved towards the side of the loading tray opposite to the unloading flap, each individual poultry is successively forced to take position onto the discharge conveyor, without causing a great disturbance of the poultry. After the poultry is positioned onto the discharge conveyor, the further conveyance towards a following processing apparatus occurs, such as an apparatus for suspending the poultry with its legs from a suspension conveyor.

Within the general concept of the present invention, several possibilities exist. A first category of methods is characterized in that during the unloading operation the loading tray is stationary, whereas the discharge conveyor is moved. In this manner, the movement of the discharge conveyor relative to the loading tray is obtained. A corresponding effect is created by a second category of methods, which is characterized in that during the unloading operation the discharge conveyor is stationary, whereas the loading tray is moved. In this manner too, the desired movement of the discharge conveyor relative to the loading tray occurs.

For realizing the latter category of methods several possibilities exist. It is conceivable that the poultry transport container is moved in its entirety, whereas the loading tray assumes a fixed position relative thereto. Thus, for carrying out this method a poultry transport container may be used which in substance forms a rigid constructive unit, apart from the movable loading flaps. If, however, a poultry transport container is utilized of which the loading trays are movable relative to the remaining part thereof, the method is characterized in that the poultry transport container is stationary, whereas the leading tray may be moved relative thereto.

Of course methods are possible too, in which a combination of the previous variations are possible, such as partially moving the loading tray or poultry transport container, respectively, as well as at the same time partially moving the discharge conveyor. It is only important that the end of the discharge conveyor is gradually moved relative to the loading tray from the unloading flap towards the opposite side.

As an example, a variation of the method according to the invention is mentioned in which firstly the end of the discharge conveyor is moved into close proximity of the container and above the level of the loading tray to be unloaded. Next, the loading tray with its outer end positioned at the side of the unloading flap is moved until below the end of the discharge conveyor, whereafter the loading tray is moved out of the container while the discharge conveyor maintains the same position relative to the loading tray. In this manner, when the loading tray is partially moved out of the container, the discharge conveyor does not move along therewith and lowers its end substantially to engage the loading tray, and that the loading tray moves along until reaching its fully extended position and remains in this position. Whereafter, the discharge conveyor moves with its end until at the innermost end of the loading tray.

Using the variation of the method according to the invention, it is possible to unload the poultry from the container as smoothly as possible. In practice, it appears that moving the discharge conveyor into the container while at the same time the loading tray is positioned entirely in the container, may lead to a disturbance of the poultry in that the poultry flocks together at the innermost end of the loading tray. If the loading tray would then be shifted outwardly, individual poultry could get entangled with their wings. If, however, the loading tray is first partially moved out of the container before the discharge conveyor is moved with its end towards the innermost end of the loading tray, a threatening situation for the poultry is prevented.

In this variation, it is preferred that the discharge conveyor, when reaching the innermost end of the loading tray, is driven with increased velocity for a short while, whereas the loading tray and the end of the discharge conveyor move apart a short distance relative to each other and next return to the position in which the end of the discharge conveyor is positioned at the innermost end of the loading tray. Due to the to and fro movement of the discharge conveyor relative to the loading tray, poultry which is still entangled can be unloaded. The short time acceleration of the discharge conveyor then prevents the poultry from stepping back onto the loading tray when the discharge conveyor is moved out of the container.

If the method is carried out for unloading a poultry transport container comprising a number of loading trays positioned one on top of the other, one again can choose between vertically moving the discharge conveyor vertically moving the poultry transport container, respectively, for obtaining a proper orientation of the end of the discharge conveyor relative to the loading tray to be unloaded.

The apparatus for carrying out the method according to the invention is characterized by means for moving the discharge conveyor and the loading tray relative to each other. Using these means, all different movements of the poultry transport container, the loading tray and the discharge conveyor, respectively, may be realized.

Thus, it is possible that the discharge conveyor is movable, or that means are provided for moving the poultry transport container itself or for moving the loading tray. In such a case, also a combination of such provisions may be provided.

Finally an embodiment of the apparatus according to the invention is mentioned, in which the discharge conveyor comprises a conveyor belt, of which the end applicable above the loading tray has a small constructive height. Using such a discharge conveyorthe poultry can be unloaded without having to overcome a large difference in level to be positioned onto the discharge conveyor. A disturbance of the poultry then may be prevented or may be minimized.

Hereinafter the invention will be elucidated referring to the drawing, in which a number of embodiments are illustrated.

Figure 1:
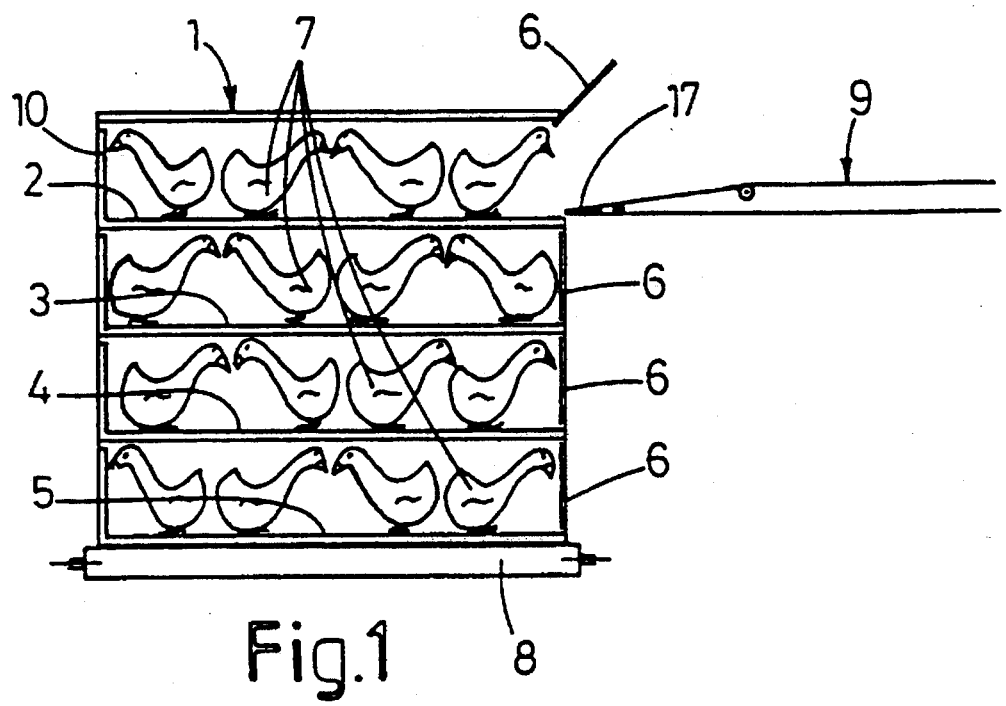
FIG. 1 shows a first phase while carrying out a method according to the invention.

Reference will now be made in detail to the presently preferred embodiments of the invention, one or more examples of which are illustrated in the accompanying drawings. Each example is provided by way of explanation of the invention, not limitation of the invention. The numbering of components in the drawings is consistent throughout the application, with the same components having the same number in each of the drawings.

DESCRIPTION OF THE PREFERRED EMBODIMENTS

FIG. 1 shows a poultry transport container 1 comprising a number of loading trays 2 to 5 positioned one on top of the other. Each loading tray 2 to 5 comprises an unloading flap 6. On top of the loading trays poultry, such as chickens 7, is supported.

Figure 2:
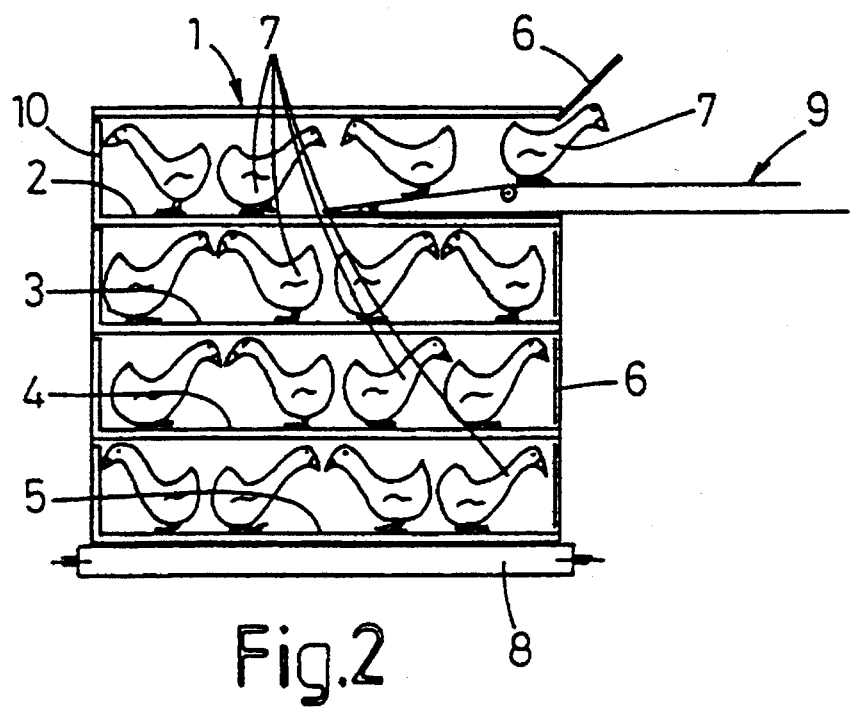
FIG. 2 shows a later phase while carrying out the method of FIG. 1.

Using a supplying apparatus 8, only indicated schematically, the poultry transport container can be supplied to an unloading station at which a discharge conveyor 9 is provided. For unloading the poultry from the transport container 1 using the discharge conveyor 9, firstly an unloading flap 6 belonging to a loading tray to be unloaded is opened by means not shown in detail. Next, the end of the discharge conveyor 9 is positioned closely above the respective loading tray (for example loading tray 2 in FIG. 1) from the side of the unloading flap. Then, the end of the discharge conveyor 9 is gradually moved towards the side of the loading tray opposite to the unloading flap. This has been indicated schematically in FIG. 2. During this movement of the discharge conveyor 9, chickens 7 will successively be forced to take position on the end of the discharge conveyor 9 and they will be discharged from the poultry transport conveyor through this discharge conveyor. In this way, the entire respective loading tray can be unloaded by moving the end of the discharge conveyor 9 to the rear most boundary wall 10 of the loading tray.

Figure 3:
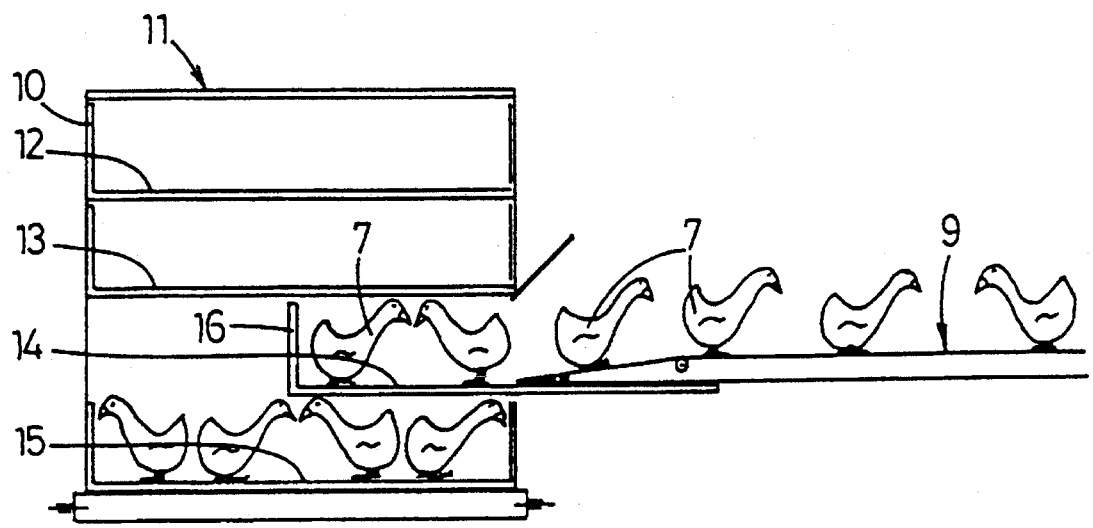
FIG. 3 shows a phase while carrying out an alternative method according to the invention.

While applying the end of the discharge conveyor 9, it firstly may be supplied at some distance above the respective loading tray and next be lowered, such that one can take account for variations in shape or position of the loading tray. In the embodiment of the method according to FIGS. 1 and 2, the poultry transport container 1 and the loading trays 2 to 5 provided therein have a stationary position, whereas the discharge conveyor is moved (by means not shown). However, it is possible that the discharge conveyor 9 assumes a stationary position, whereas the poultry transport container 1 or the loading trays 2 to 5 are moved. An example thereof is shown in FIG. 3, in which a poultry transport container 11 is visible comprising loading trays 12 to 15 movable relative thereto. In the situation illustrated in FIG. 3, loading trays 12 and 13 already have been unloaded, whereas unloading of load tray 14 is being carried out. In this case the discharge conveyor 9 assumes a fixed position, whereas the loading tray 14 is gradually moved to the right, such that its boundary wall 16 increasingly approaches the end of the discharge conveyor 9 thus forcing all chickens 7 to take place onto the discharge conveyor.

The relative horizontal displacements of the discharge conveyor 9 relative to the loading trays 2 to 5 and 12 to 15 further could be realized by a combination of the movements described above. Further, it is possible that starting from the situation in FIG. 1, the entire poultry transport container 1 together with loading trays 2 to 5 is moved to the right.

With respect to the relative vertical displacement between the discharge conveyor 9 and the loading trays, basically the same applies. The poultry transport containers 1 and 11, respectively, could be displaceable vertically, the discharge conveyor 9 could be displaceable vertically, or a combination of such movements could be provided for.

For carrying out such movements in accordance with the invention appropriate means are applied, as a result of which the discharge conveyor may be moved or moving the poultry transport container 1 and 11, respectively, or moving the loading trays 2 to 5 or 12 to 15, respectively, is made possible.

Figure 4:
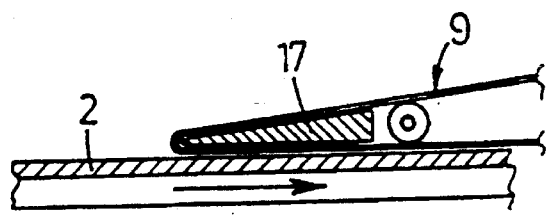
FIG. 4 shows a detail of an embodiment of the apparatus for carrying out the method according to the invention and, FIGS. 5a–i show in nine successive steps the method according to the invention.

FIG. 4 shows on a larger scale the end of an embodiment of the discharge conveyor 9, which in the present case comprises a conveyor belt, of which the end applicable above the loading tray (for example loading tray 2) has a relatively small constructive height. This may be realized using special guidings 17 or alike.

A special variation of the method according to the invention will now be described, as illustrated in FIG. 5. A poultry transport container 1 having a loading tray to be unloaded is provided. The container 1 is provided with an unloading flap 6 belonging to the loading tray, whereas the loading tray comprises at its innermost end a boundary wall 16. Further the discharge conveyor 9 is represented.

In a first step (FIG. 5a), the loading tray is positioned entirely in the container 1, the unloading flap 6 is still closed and the discharge conveyor 9 is moved towards the container 1.

In the next step (FIG. 5b), the unloading flap 6 is opened, the discharge conveyor 9 is positioned with its end near to the container 1 and at some distance above the level of the loading tray, and the loading tray is positioned with its outermost end just below the end of the discharge conveyor 9.

Next (FIG. 5c), the loading tray and the discharge conveyor 9 commonly move to the right, whereby their relative position does not change. When the loading tray has moved out of the container 1 over some distance, for example half of its length (FIG. 5d), the end of the discharge conveyor 9 is lowered until substantially at the level of the loading tray.

Figure 5A:
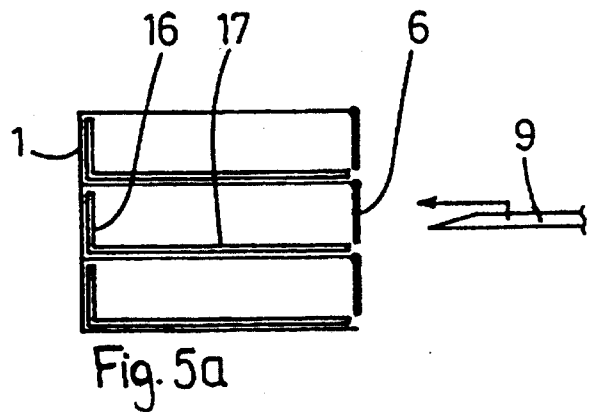
Figure 5B:
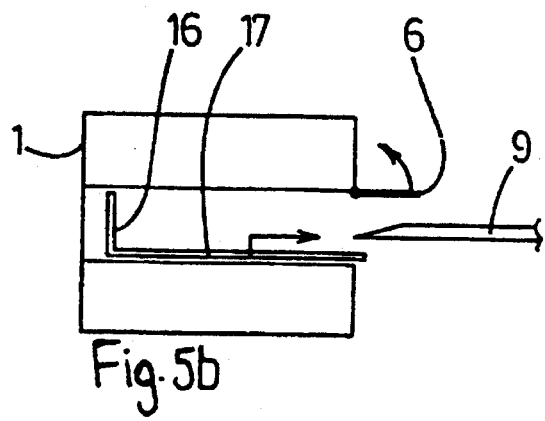
Figure 5C:
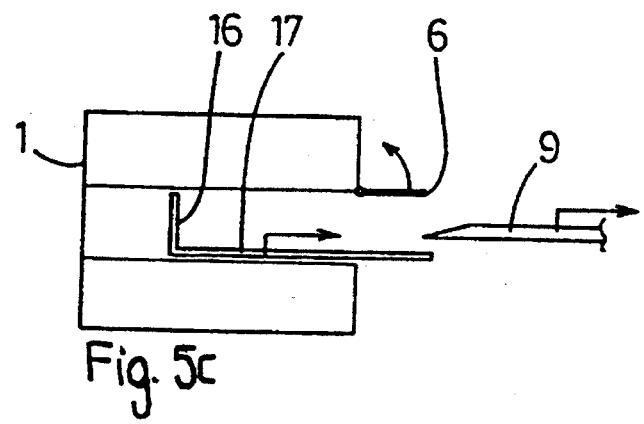
Figure 5D:
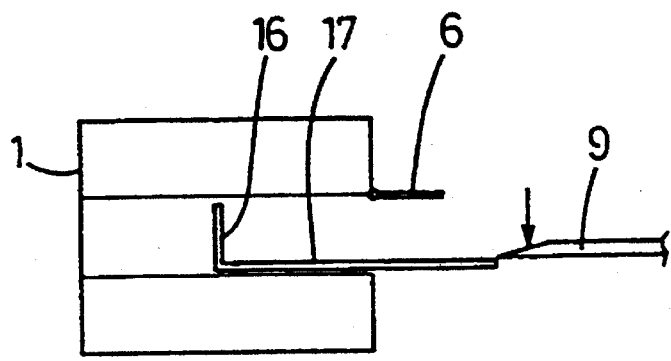
Figure 5E:
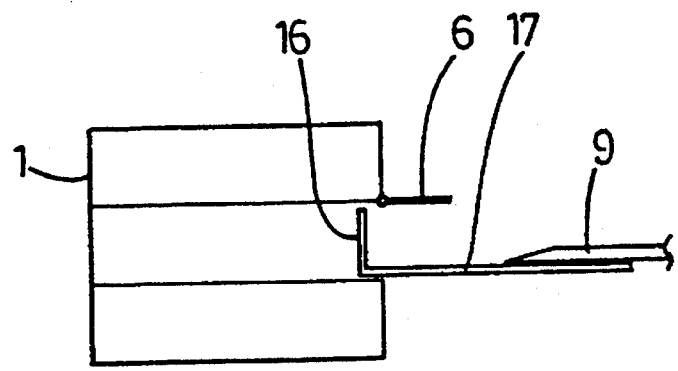

Next only the loading tray moves along until it is in a totally extended position (FIG. 5e).

Figure 5F:
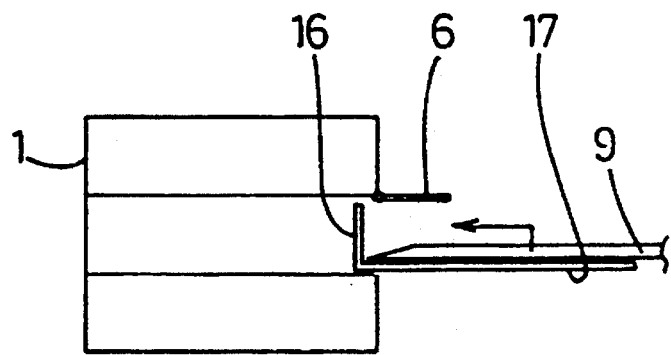
Figure 5G:
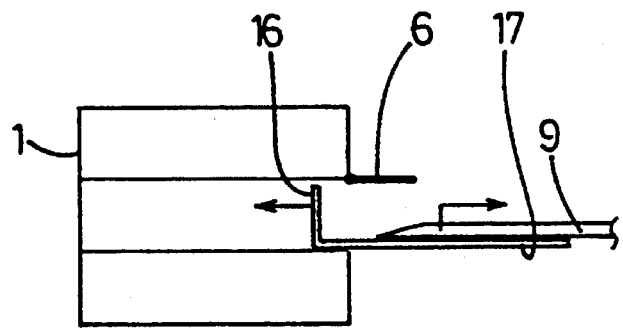
Figure 5H:
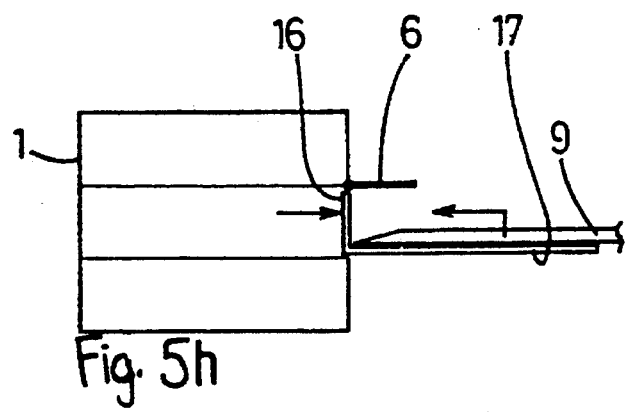

Then, the loading tray is maintained in the position reached, whereas the discharge conveyor is moved into the direction of the innermost end of the loading tray defined by the boundary wall (FIG. 5f). After having reached this innermost end, the discharge conveyor is for a short while accelerated, wherein further its end is again moved to the right over a short distance. At the same time the loading tray is moved over a short distance to the left (FIG. 5g).

Next (FIG. 5h), a movement opposite to that just described occurs, such that the end of the discharge conveyor 9 reaches again the innermost end of the loading tray.

Figure 5I:
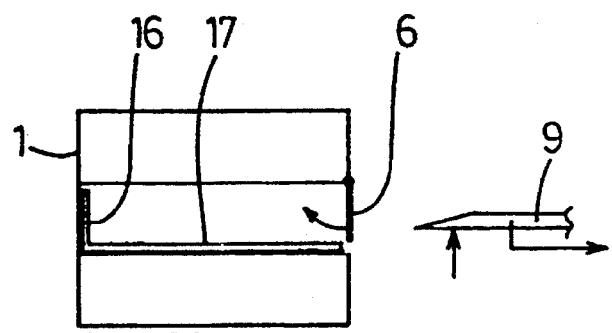

Finally the discharge conveyor 9 moves entirely out of the container 1, while the loading tray is entirely retracted in the container 1 towards its original position (FIG. 5i). The unloading flap is closed again.

Using the variation of the method according to the invention just described, the poultry can be unloaded without disturbance. Only after the loading tray has been moved out of the container 1 over some distance (preferably half of its length), the discharge conveyor 9 is moved into the direction of the innermost end of the loading tray. As a result, the poultry is hardly disturbed. If however, the discharge conveyor would be moved directly into the container 1 the risk occurs that the poultry is terrified and flocks together at the boundary wall 16 and gets entangled.

The to and fro movement of the discharge conveyor relative to the loading tray is meant for unloading of poultry that nevertheless got entangled. By, for a short period, increasing the velocity of the discharge conveyor one can prevent the poultry from stepping back from the discharge conveyor onto the loading tray.

The invention is not limited to the embodiments described before, which can be varied widely within the scope of the invention. In fact, it will be apparent to those skilled in the art that various modifications and variations can be made in the present invention without departing from the scope or spirit of the invention. Thus, it is intended that the present invention cover such modifications and variations as come within the scope of the appended claims and their equivalents.

I claim:

1. A method for unloading poultry from a poultry transport container, the poultry transport container including at least one loading tray with an openable unloading flap, said method comprising the steps of opening the unloading flap and moving an end of a discharge conveyor to just above the loading tray; gradually displacing at least one of said discharge conveyor and said loading tray in a longitudinal direction so that the end of said discharge conveyor moves within the loading tray and approaches a side of the loading tray opposite the unloading flap wherein poultry within the loading tray are gradually forced onto the discharge conveyor; and after the poultry has taken position on the discharge conveyor gradually displacing at least one of said discharge conveyor and said loading tray in a longitudinal direction so that the discharge conveyor is withdrawn from the loading tray, wherein the poultry on the discharge conveyor can be delivered to a first processing station by the discharge conveyor.

2. The method as in claim 1, comprising holding the loading tray stationary while moving the discharge conveyor in a longitudinal direction relative thereto.

3. The method as in claim 1, comprising holding the discharge conveyor stationary while moving the loading tray in a longitudinal direction relative thereto.

4. The method as in claim 1, comprising moving both of the discharge conveyor and the loading tray in longitudinal directions.

5. The method as in claim 1, further comprising moving the end of the discharge conveyor into close proximity of the container at a height above the loading tray to be unloaded; moving the loading tray in a longitudinal direction to a position just below the discharge conveyor; gradually moving the loading tray out of the container while simultaneously moving the discharge conveyor in the same longitudinal direction so that the loading tray and discharge conveyor maintain the same relative position; once the loading tray has moved at least partially out of the container, stopping movement of the discharge conveyor and lowering the discharge conveyor to engage the loading tray while the loading tray continues to move to its fully extended position out of the container; and finally moving the discharge conveyor towards the loading tray until the discharge conveyor is essentially at the end of the loading tray opposite the unloading flap.

6. The method as in claim 5, comprising moving the loading tray out of the container substantially half of its length before stopping and lowering the discharge conveyor.

7. The method as in claim 5, further comprising moving the discharge conveyor with increased velocity in a direction away from the loading tray after the discharge conveyor has moved to the end of the loading tray opposite the unloading flap so that the discharge conveyor and unloading tray move apart a short distance, and subsequently moving the discharge conveyor back to its position at the end of the loading tray opposite the unloading flap.

8. The method as in claim 7, further comprising moving the loading tray from its fully extended position in a direction towards the container while the discharge conveyor is moved with increased velocity in a direction away from the loading tray, and subsequently moving the loading tray back to its fully extended position.

* * * * *